Oct. 9, 1923.

W. N. BOOTH 1,469,768

METALLIC FELLY FOR VEHICLE WHEELS

Filed April 2, 1919

Inventor
William N. Booth

By Whittemore Hulbert & Whittemore

Attorneys

Patented Oct. 9, 1923.

1,469,768

UNITED STATES PATENT OFFICE.

WILLIAM N. BOOTH, OF DETROIT, MICHIGAN.

METALLIC FELLY FOR VEHICLE WHEELS.

Application filed April 2, 1919. Serial No. 286,994.

*To all whom it may concern:*

Be it known that I, WILLIAM N. BOOTH, a citizen of the United States of America, residing at Detroit, in the county of Wayne and State of Michigan, have invented certain new and useful Improvements in Metallic Fellies for Vehicle Wheels, of which the following is a specification, reference being had therein to the accompanying drawings.

The invention relates to vehicle wheels having U-shaped fixed rims designed to receive demountable rims, and the invention consists, first, in the means for forming and reinforcing the seat for the demountable rim; second, in the construction by which the demountable rim is guided to its seat; third, in various features of construction as hereinafter set forth.

A is a fixed rim which is of channel shaped cross-section having the parallel outwardly extending sides B and C terminating in laterally-extending flaring or conical flanges D and E for engagement with the demountable rim F. It is of the greatest importance in mounting a rim upon a fixed rim that it should run true, as otherwise it will produce a wobbling motion which greatly increases the wear of the tire. It is, therefore, the usual practice to form a flaring or conical flange on the fixed rim which constitutes a seat for one side of the demountable rim, the other side being secured either by clamping lugs, a wedge ring or other equivalent means. While the conical flange tends to straighten up the rim, it is necessary in entering the rim upon said flange to hold it substantially true and for this purpose a guide bearing is formed on the opposite side of the fixed rim. If, however, this guide bearing also forms a seat for the demountable rim it will be impossible in the commercial manufacture of rims to insure seating on both flanges, and consequently the rim may be unsecurely fastened upon the wheel.

Figure 1:
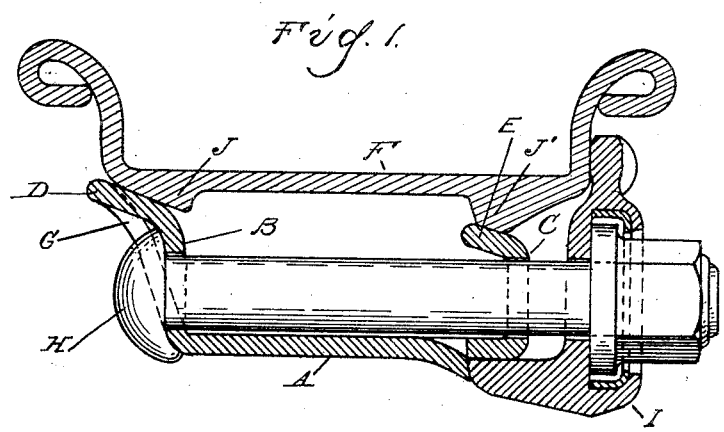
Figure 1 is a cross-section through the fixed rim showing a demountable rim in engagement therewith.
Figure 2:
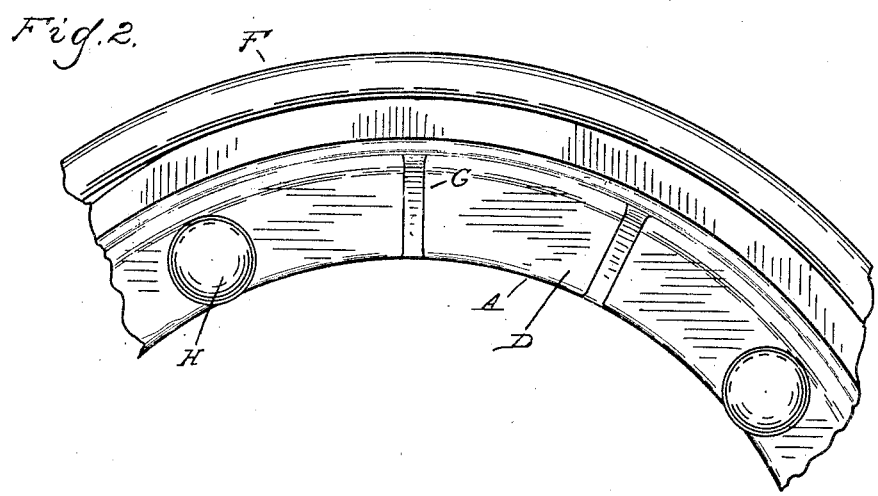
Figure 2 is a side elevation of a portion of the fixed rim and demountable rim.

With the present invention I have devised a construction in which the demountable rim will seat only upon the inner conical flange, but it is also provided with a guide bearing on the opposite side of the fixed rim for holding the rim substantially true during the clamping action. Specifically the construction consists in the conical seating flange, which is at a predetermined angle to the axis of the wheel, and a guide flange, which is at a different angle and is provided with a slight clearance from the co-operating part of the demountable rim when the latter is firmly seated on the inner flange. Thus, in entering the rim the clearance from both fixed rim flanges is substantially the same, but as the rim is forced inward the steeper pitch of the inner flange will cause that side of the rim to find its seat before the opposite side of the rim can seat on the fixed rim. In Fig. 1 the difference in angles of the flanges D and E is clearly indicated, and it will be observed that when the rim F is seated on the flange D it slightly clears the flange E.

Where the conical seat flange is at the outer edge of a channel section fixed rim there is danger under heavy stresses of bending it outward. To guard against this result without unduly increasing the weight of metal in the fixed rim I have formed a braced construction in which the metal of the side B and flange D is at intervals pressed outward to form an inclined brace G. As shown in Figure 2 a suitable number of these braces G are arranged intermediate the bolts H, which are used for clamping the rim upon the fixed rim, and the trussing effect is such as to greatly strengthen and stiffen the flange.

As has been previously stated, the rim may be clamped upon the fixed rim by any suitable means, but, as shown in Figure 1, clamping lugs I are arranged to engage the clamping bolts H and to bear against the outer flange of the rim. The rim F is also formed with inwardly extending bearing portions J and J' for respectively engaging the flanges D and E.

What I claim as my invention is:—

1. The combination with a demountable rim, of a metallic fixed rim having a radial outwardly extending flange terminating in a laterally flaring flange forming a seat for one side of said demountable rim, the metal at the angle between said flanges being pressed outward at intervals to form braces.

2. The combination with a demountable rim, of a metallic fixed rim having a radial outwardly extending flange rounding into a laterally flaring flange which forms a seat for one side of said demountable rim, the metal forming said flanges being pressed outward at intervals to form diagonal braces between said flanges.

3. The combination with a demountable rim, of a metallic fixed rim of channel cross-section and having a laterally flaring flange at one side thereof for forming a seat for the demountable rim, the metal forming the side of the channel and said flaring flange being pressed outward at intervals to form diagonally extending braces.

4. The combination with a metallic U-shaped fixed rim having a conical flange at one edge adapted to form a seat for a demountable rim and a radial outwardly-extending flange at the opposite edge adapted to form a guide for the demountable rim, of a demountable rim having a portion adapted for wedge engagement with said conical flange and a second portion adapted for guiding engagement with said radial flange, and means for laterally forcing said demountable rim onto said fixed rim to secure a firm engagement upon said conical flange, there being clearance between said radial flange and demountable rim when the latter is in firm engagement with said conical flange.

5. The combination with a demountable rim, of a metallic fixed rim providing a seat for one side of said demountable rim and having a radial outwardly extending flange and a laterally extending flange, the metal at the angle between said flanges being pressed laterally at intervals to form braces.

In testimony whereof I affix my signature.

WILLIAM N. BOOTH.